(12) United States Patent
Koshiishi

(10) Patent No.: US 6,509,046 B1
(45) Date of Patent: Jan. 21, 2003

(54) METHOD OF TREATING RICE BRAN AND PRODUCT THEREOF

(76) Inventor: Ikuo Koshiishi, 4-9 Jyoto 3-chome, Kofu-shi, Yamanashi-ken (JP)

( * ) Notice: Subject to any disclaimer, the term of this patent is extended or adjusted under 35 U.S.C. 154(b) by 0 days.

(21) Appl. No.: 09/448,502

(22) Filed: Nov. 24, 1999

(51) Int. Cl.$^7$ ............................................. A23L 1/172
(52) U.S. Cl. ............................ 426/99; 426/307; 426/618
(58) Field of Search .................. 426/99, 305, 307, 426/618

(56) References Cited

U.S. PATENT DOCUMENTS

| | | | |
|---|---|---|---|
| 4,568,557 A | 2/1986 | Becker et al. | 426/618 |
| 4,673,578 A | 6/1987 | Becker et al. | 426/93 |
| 5,476,678 A | 12/1995 | Walter et al. | 426/660 |

FOREIGN PATENT DOCUMENTS

| | | |
|---|---|---|
| EP | 0 835 612 A | 4/1998 |
| JP | 62 236453 A | 10/1987 |
| JP | 01 039953 A | 10/1989 |
| JP | 07 008158 A | 1/1995 |

*Primary Examiner*—Arthur L. Corbin
(74) *Attorney, Agent, or Firm*—Lawrence E. Laubscher, Jr.

(57) ABSTRACT

A method for producing an additive for bread including adding charcoal to rice bran, a water elimination process, which eliminates water by roasting or drying the rice bran and an oil-fat coating process by adding an oil-fat to a dried rice bran and mixing therewith, such process covering a surface of the dried rice bran. Therefore, the smell and bitterness derived from the rice bran is prevented.

2 Claims, 13 Drawing Sheets

METHOD OF TREATING RICE BRAN AND PRODUCT THEREOF

BACKGROUND OF THE INVENTION

The present invention relates to a method for producing additive for bread and additive for bread. The additive of the present invention is applicable particularly, but not exclusively, to use for bread such as a loaf of bread, cracker (hard biscuit), cakes, cookies, a sort of noddles, a sort of pasta such as a spaghetti or ravioli and, foods for dogs.

A conventional rice bran, that is taken as a by-product in the process of polishing an unmilled rice, contains a large quantity of high nutritive essential fatty acids such as minerals, vitamins, fiber, linoleum acid.

The fiber, which is contained particularly in a large quantity, has an effect of controlling increasing serum cholesterol, of preventing obesity and diabetes, and of removing a poisonous substance in a food preventing appendicitis and colon cancer.

In a recent study (Fukuoka Prefecture Institute for Hygiene and Environment) is shown that dioxins such as polychlorinated dibenzo-p-dioxins (PCDDs) and polychlorinated dibenzofurancs (PCDFs), which are accumulated in the human body, can be removed by the fiber contained in the rice bran.

Accordingly, Japanese Patent Application Laid-Open No. Hei 7-8158 and Sho 63-58544 disclose the use of the roasted or heat-treated rice bran as an additive for a confectionery such as bread or cookie.

However, even though the roasted or heat-treated rice bran as an additive is added 5 to 10% by weight of materials for a confectionery such as bread or cookie the consumer refuses foods such as the confectionery having such unique smell and bitterness derived from the rice bran because the rice bran has unique smell and bitterness.

SUMMARY OF THE INVENTION

In the view of the foregoing, it is an object of the present invention to provide a method for producing an additive for bread and additive for bread which prevent the unique smell and bitterness derived from the rice bran. It is another object of the present invention to provide a method for producing an additive for bread and additive for bread which maintain a taste and effect provided by the rice bran even though the rice bran is used as the additive for bread such as a loaf of bread, cracker (hard biscuit), cakes, cookies, a sort of noddles, a sort of pasta such as a spaghetti or ravioli, or foods for dog.

The above and further objects and novel features of the invention will more fully appear from the following detailed description when the same is read in connection with the accompanying drawings.

It is to be expressly understood, however, that the drawings if for the purpose of illustration only and is not intended as a definition of the limits of the invention.

DESCRIPTION OF THE PREFERRED EMBODIMENT

Preferred embodiments of the present invention are described in more detail below referring to the accompanying drawings.

Figure 1:
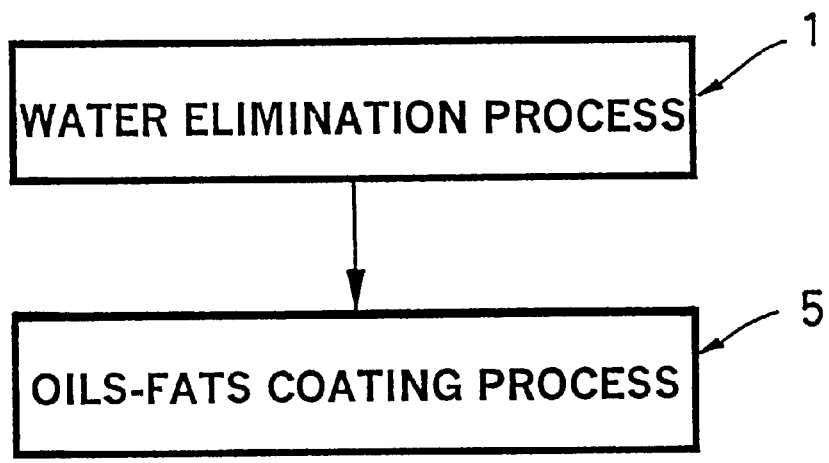
FIG. 1 is a flow chart showing a first embodiment of the present invention.
Figure 2:
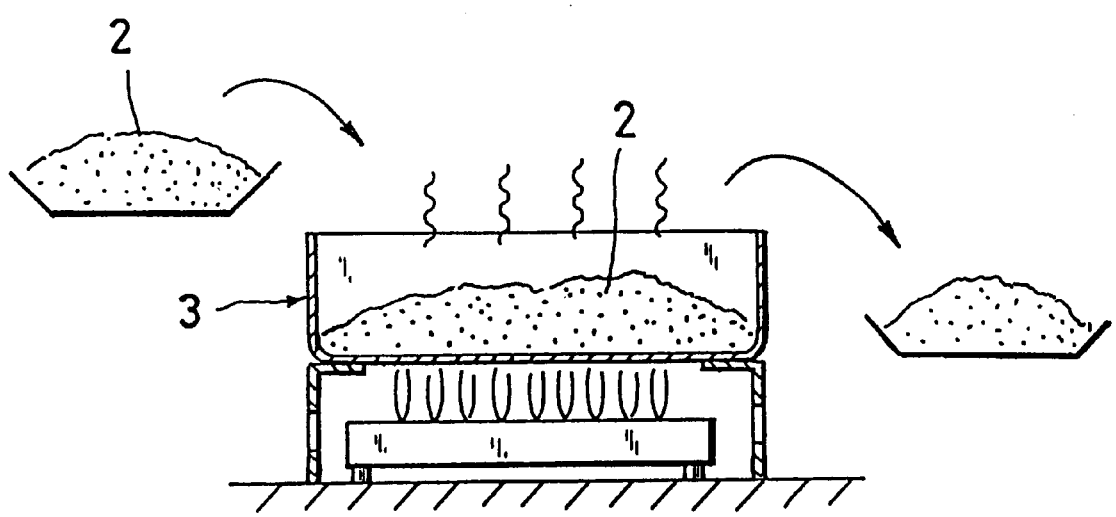
FIG. 2 is an explanatory view of a water elimination process showing a first embodiment of the present invention.

An understanding of the present invention may be best gained by reference to FIGS. 1 to 7. Numeral 1 shows a water elimination process to remove water contained in fresh rice bran 2. As illustrated in FIG. 2, the water elimination process 1 eliminates the water until the quantity of the contained water decreases, to two to three percent for example, by roasting with a roaster 3 or drying the rice bran 2.

Figure 3:
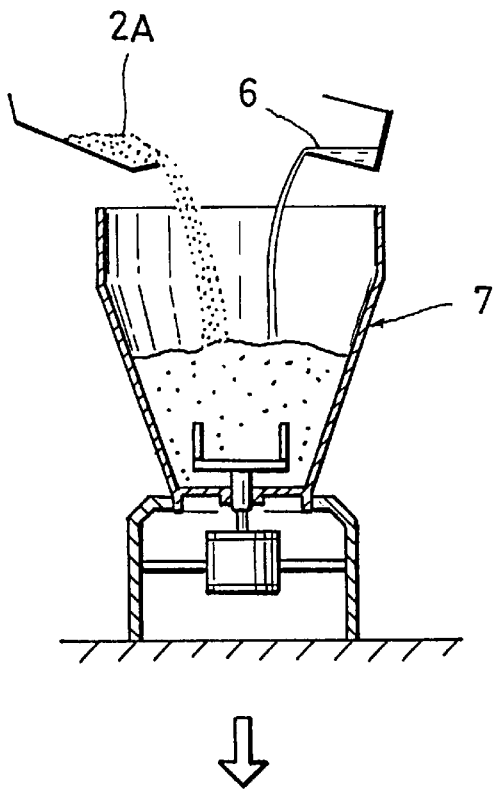
FIG. 3 is an explanatory view of an oil-fat coating process showing a first embodiment of the present invention.
Figure 3:
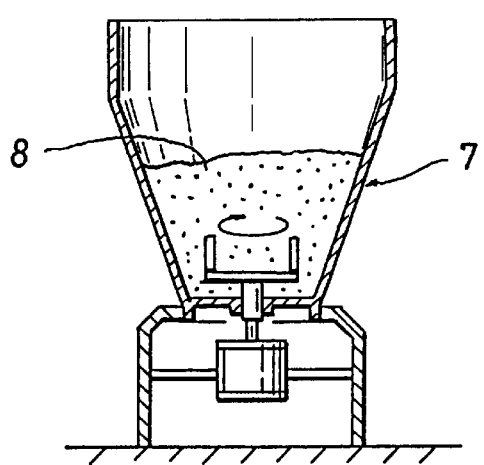
Figure 4:
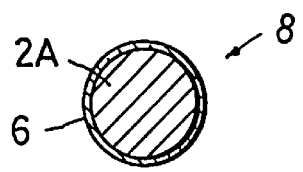
FIG. 4 is an expanded sectional view of a particle of a rice bran coated by oils-fats.

Numeral 5 shows an oil-fat coating process to coat a surface of a dried rice bran 2A by an oil-fat 6. As illustrated in FIG. 3, for example, to 1 kg of dried rice bran 2A that the water elimination process eliminates the water, 600 g of the oil-fat 6 is added and mixed. Thus, as illustrated in FIG. 4, the oil-fat coating process 5 produces an additive 8 for bread by mixing the dried rice bran 2A and oil-fat 6 by using a mixer 7.

Moreover, the oil-fat 6 in this process is an ingredient of the dough for bread, such as shortening, margarine, salad oil, olive oil, fresh batter and so forth.

Figure 5:
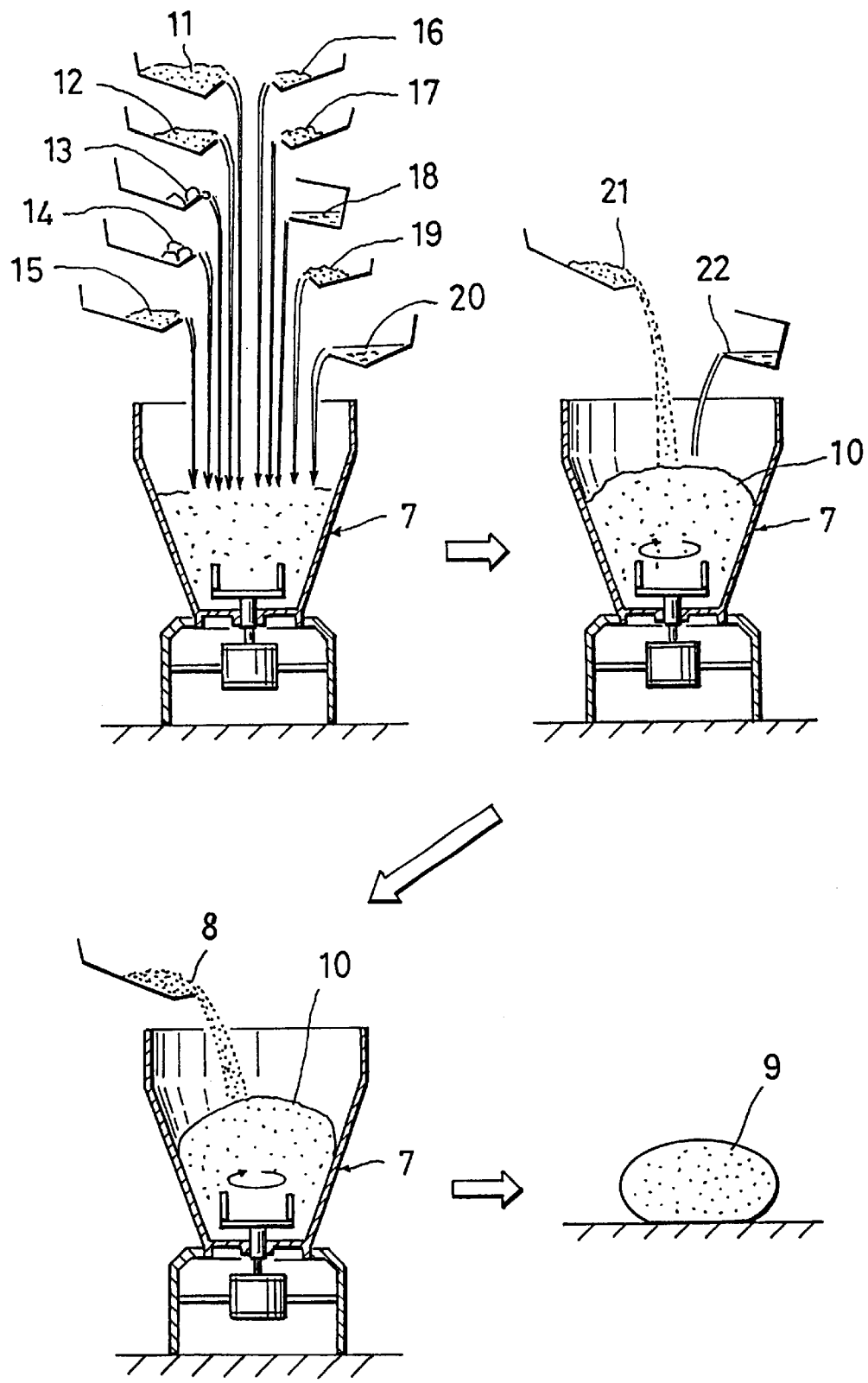
FIG. 5 is an explanatory view of making a dough of bread.

As illustrated in FIG. 5, in case of making a dough 9 of bread by using the additive 8, which is produced by the method for producing the additive of bread, 4 kg of wheat 11 and a material of a dough body 10 of the bread, 1 kg of wheat flour 12, 400 g of shortening 13, 200 g of fresh butter 14, 250 g of yeast having freezing resistance 15, 8 g of yeast-food having freezing resistance 16, 30 g of molt 17, 200 g of cream or condensed milk 18, 600 g of sugar 19, and 500 g of eggs are put into a mixer 7. In addition, a total weight of 2.2 kg of skimmed powdered milk 21 and water 22 is added into the mixer 7 and stirred.

This stirring takes about two minutes at slow speed at first, and then, about three minutes at medium speed.

Later, a dough body 10 of bread needs to be stirred about seven minutes at high speed to 80% of completion.

Next, to the wheat flour, 5 to 80% by weight of the additive 8 of bread, 20% by weight in this embodiment, is added into the mixer 7. After it stirred for two to three minutes at medium speed, the dough 9 of bread is produced.

Additionally, the completion of the dough 9 is judged on checking its stretch and stickiness. It is preferred that the dough 9 is around 26° C. at completion.

Moreover, the additive 8 may be added into the mixer 7 from the start and mixed with materials of the dough body 10 of bread. However, in this case, it is necessary to take care such that the additive 8 does not absorb the water.

Figure 6:
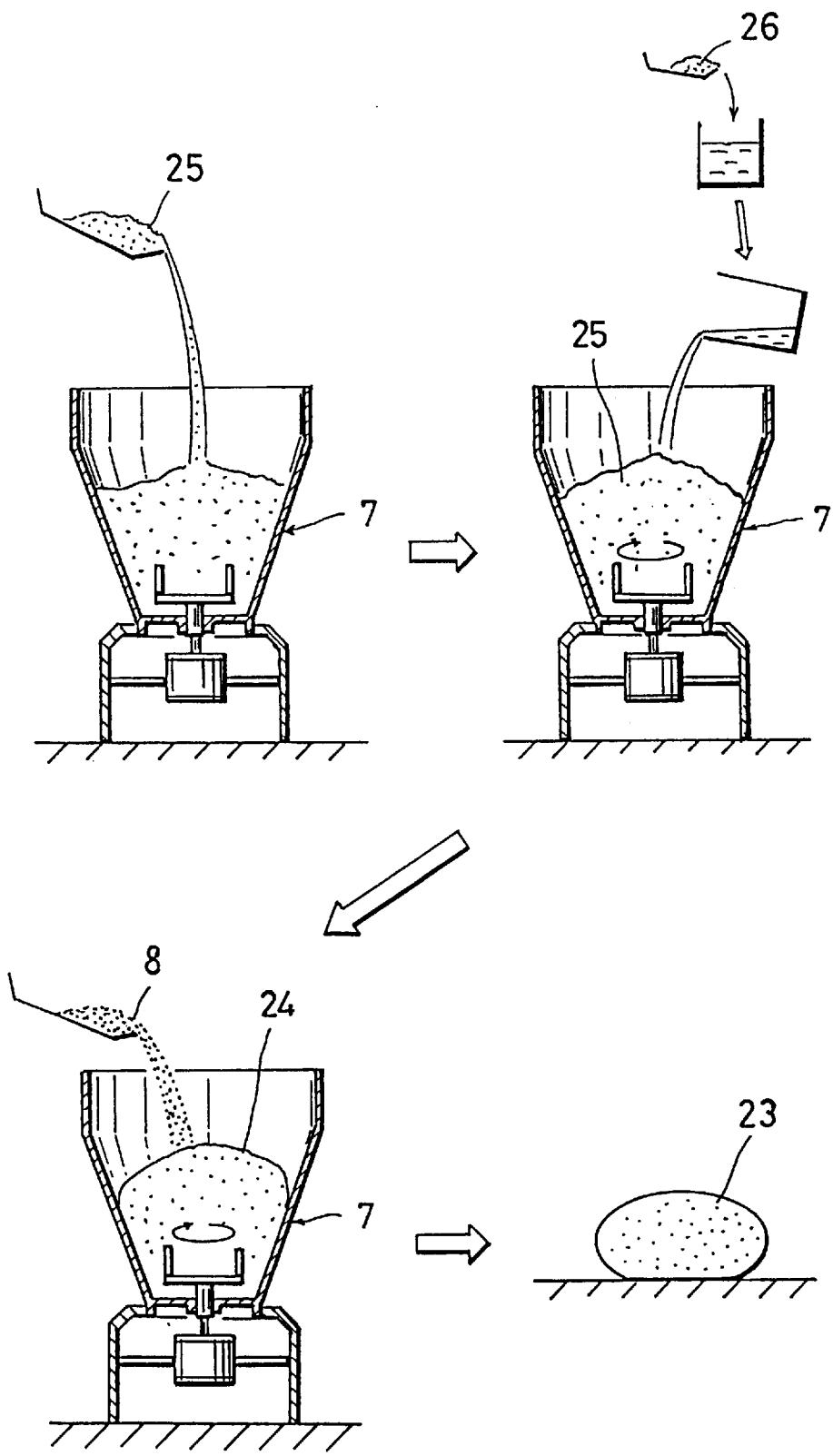
FIG. 6 is an explanatory view of making a dough of Udon (wheat vermicelli)

As illustrated in FIG. 6, in case of making a dough 23 of Udon (Japanese wheat vermicelli) by using the additive 8 of bread, 500 g of wheat 25 as materials of a dough body 24 of the Udon is prepared as shown in FIG. 6. To 280 ml of water, 40 g of salt 26 is added and mixed with such water. The aqueous solution is added to the wheat 25 and mixed in the mixer 7. Then, a lump is produced. After that, to the wheat flour 25, 5 to 80% by weight of the additive 8 of bread, 40% by weight in this embodiment, is thoroughly mixed with the lump. The dough 23 of Udon can be made.

In this case, a dough of other noodles, pasta such as spaghetti or ravioli, cakes or cookies can be made using the different materials and quantity of the dough body.

Figure 7:
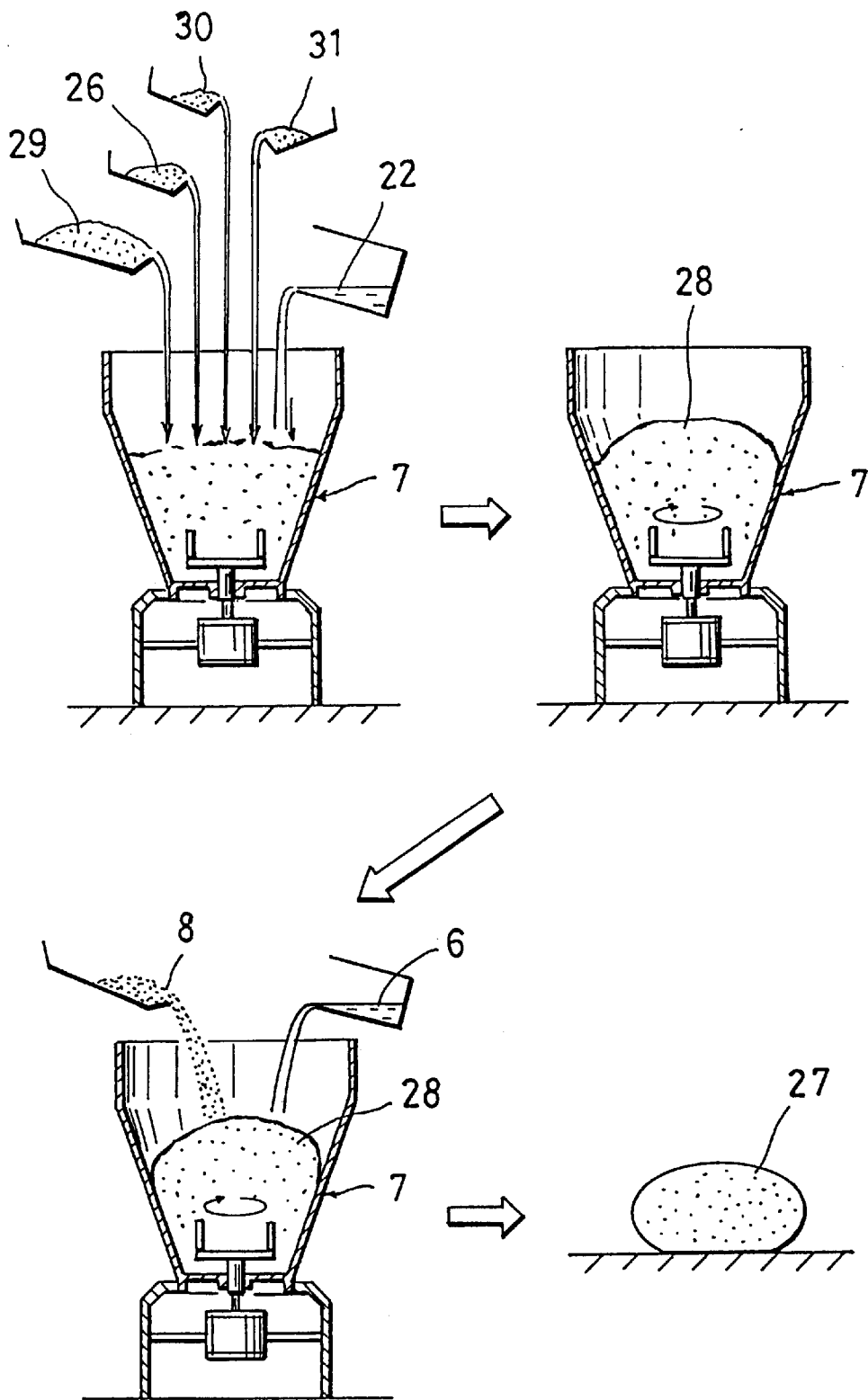
FIG. 7 is an explanatory view of making a dough of French bread.
Figure 8:
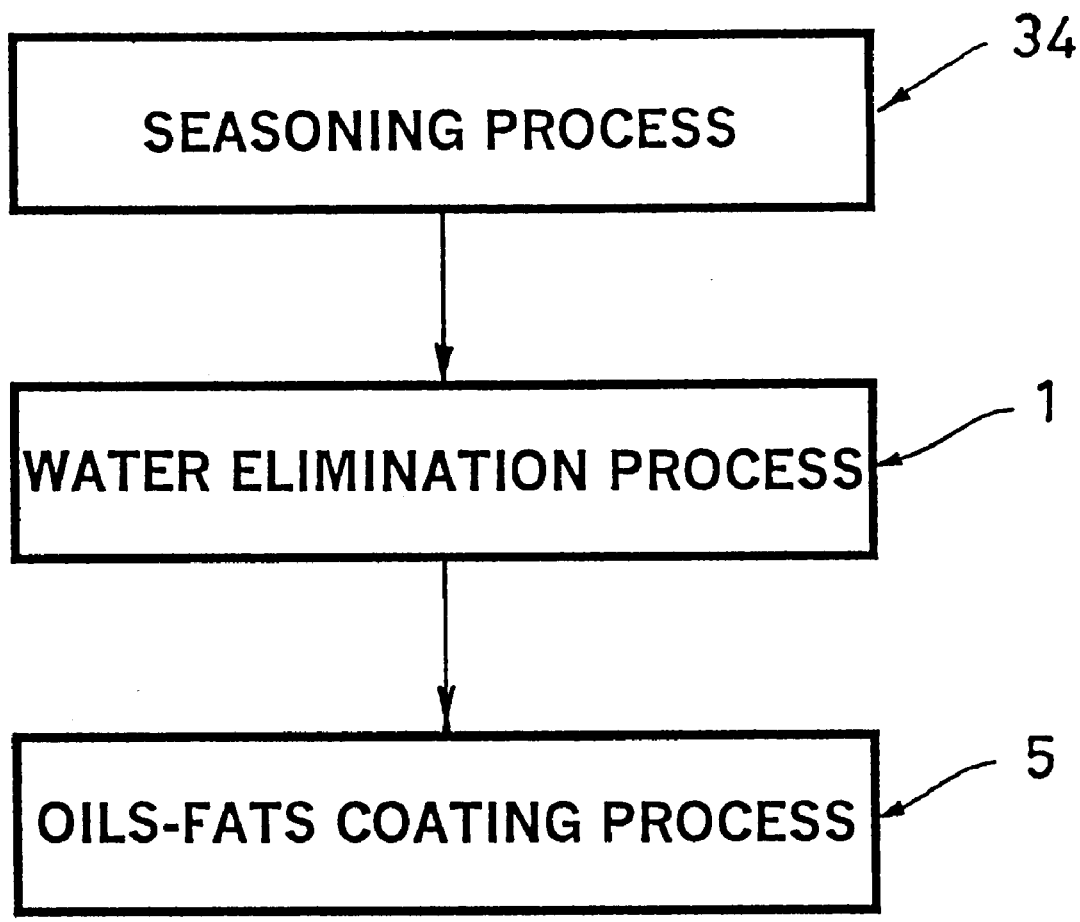
FIG. 8 is a flow chart showing a second embodiment of the present invention.
Figure 9:
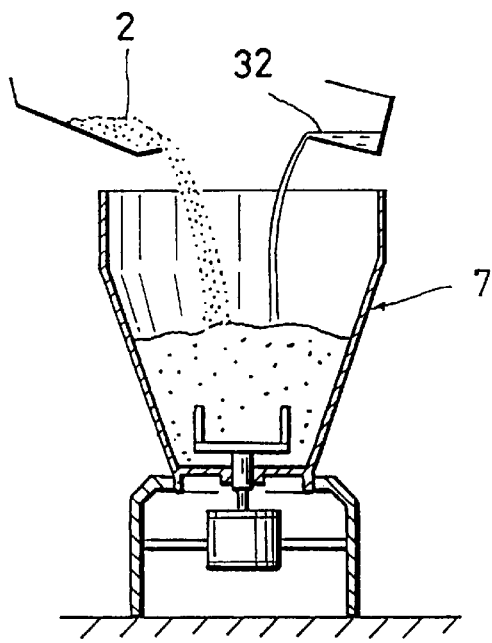
FIG. 9 is an explanatory view of a seasoning process showing a second embodiment of the present invention.
Figure 9:
Figure 9:
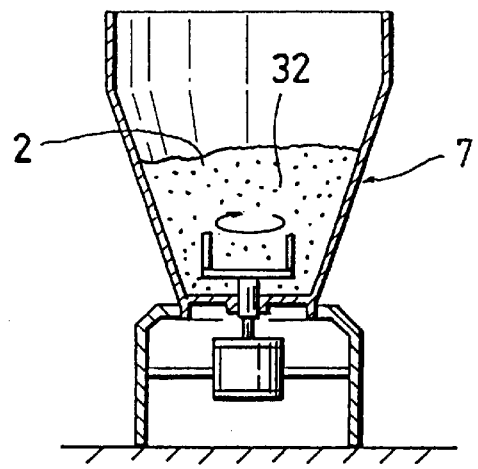
Figure 9:
Figure 9:
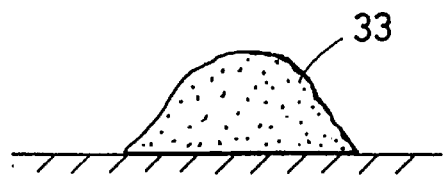
Figure 10:
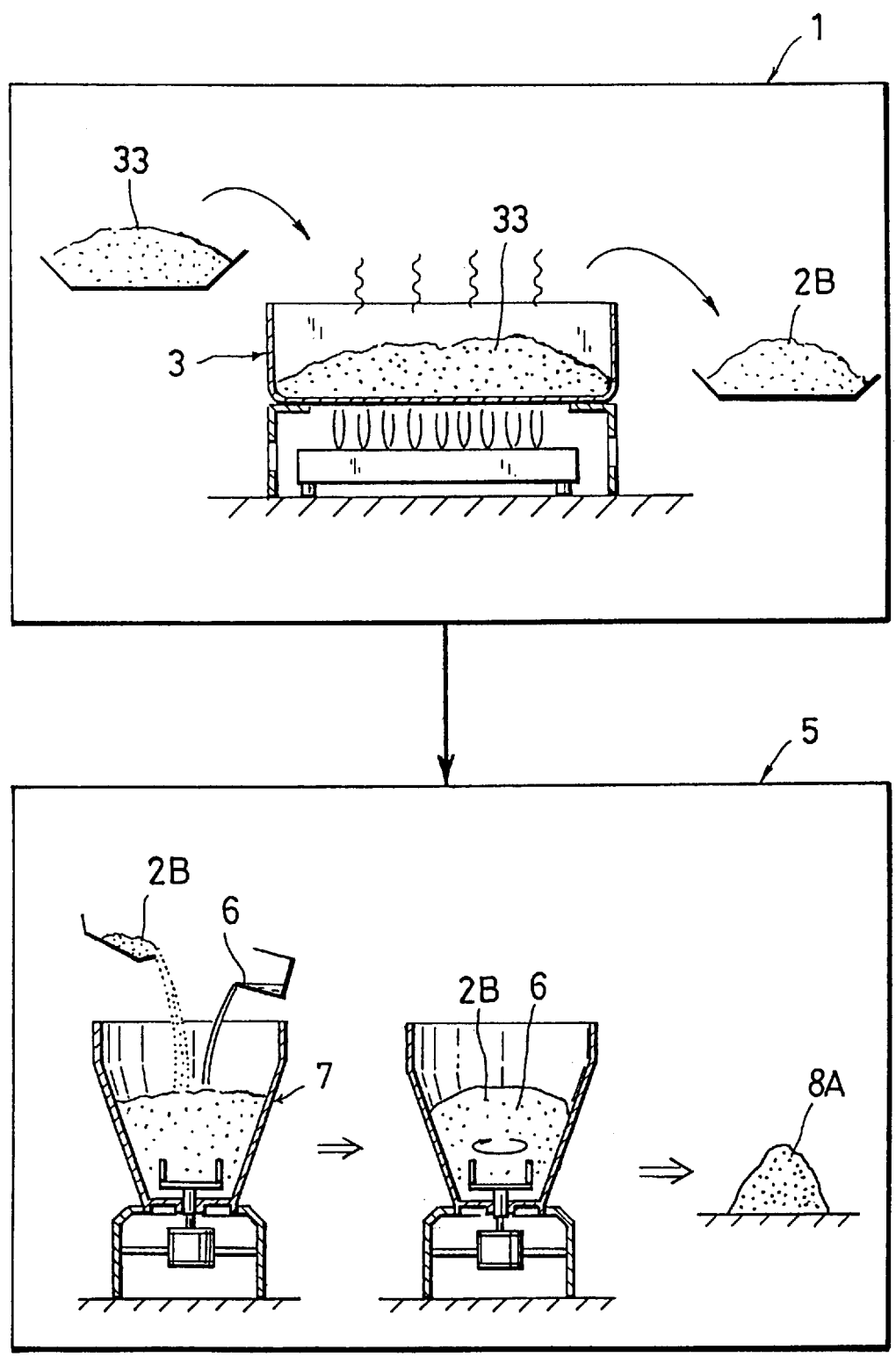
FIG. 10 is an explanatory view of a water elimination process and an oils-fats coating process.
Figure 11:
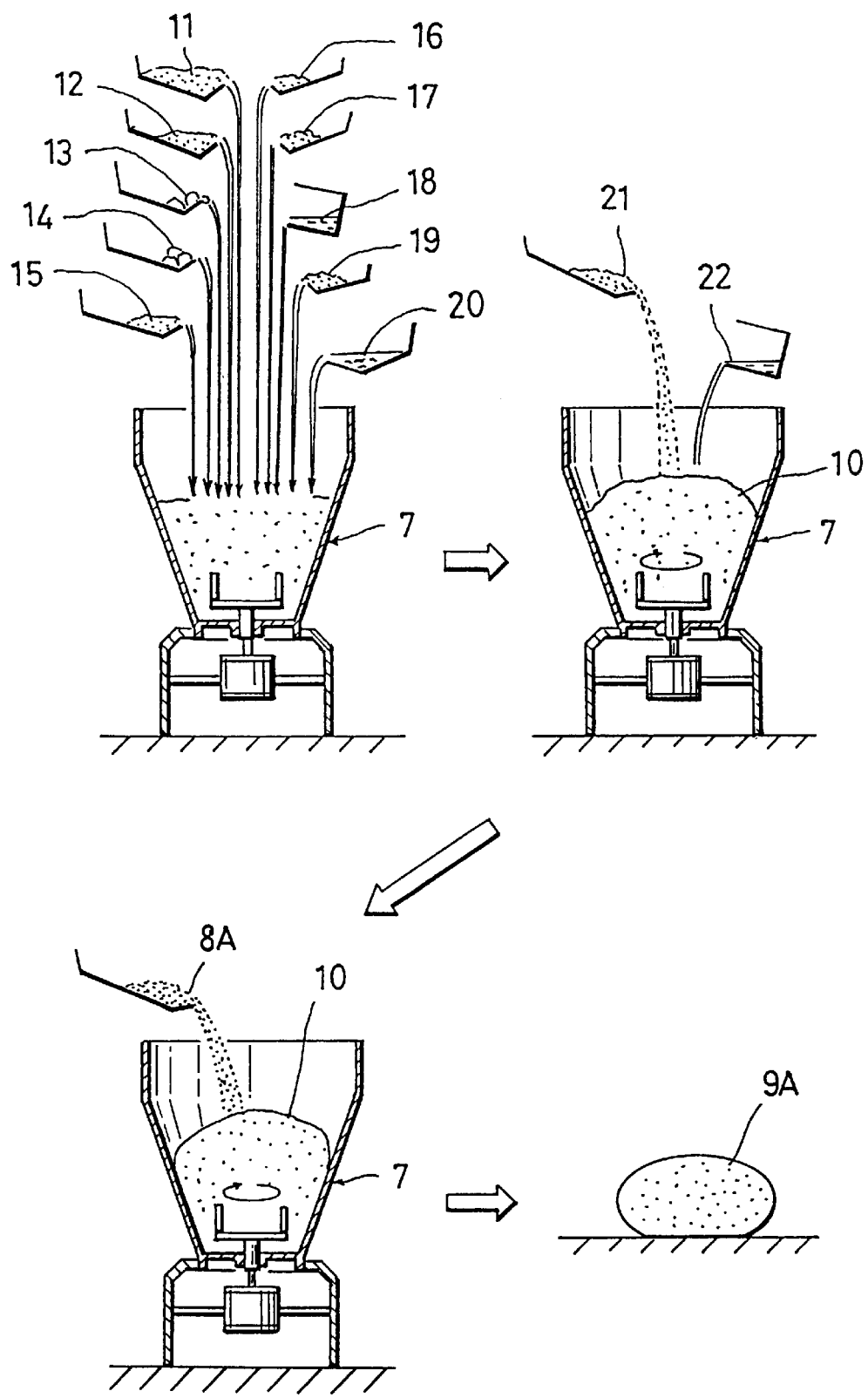
FIG. 11 is an explanatory view of making cloth of bread.
Figure 12:
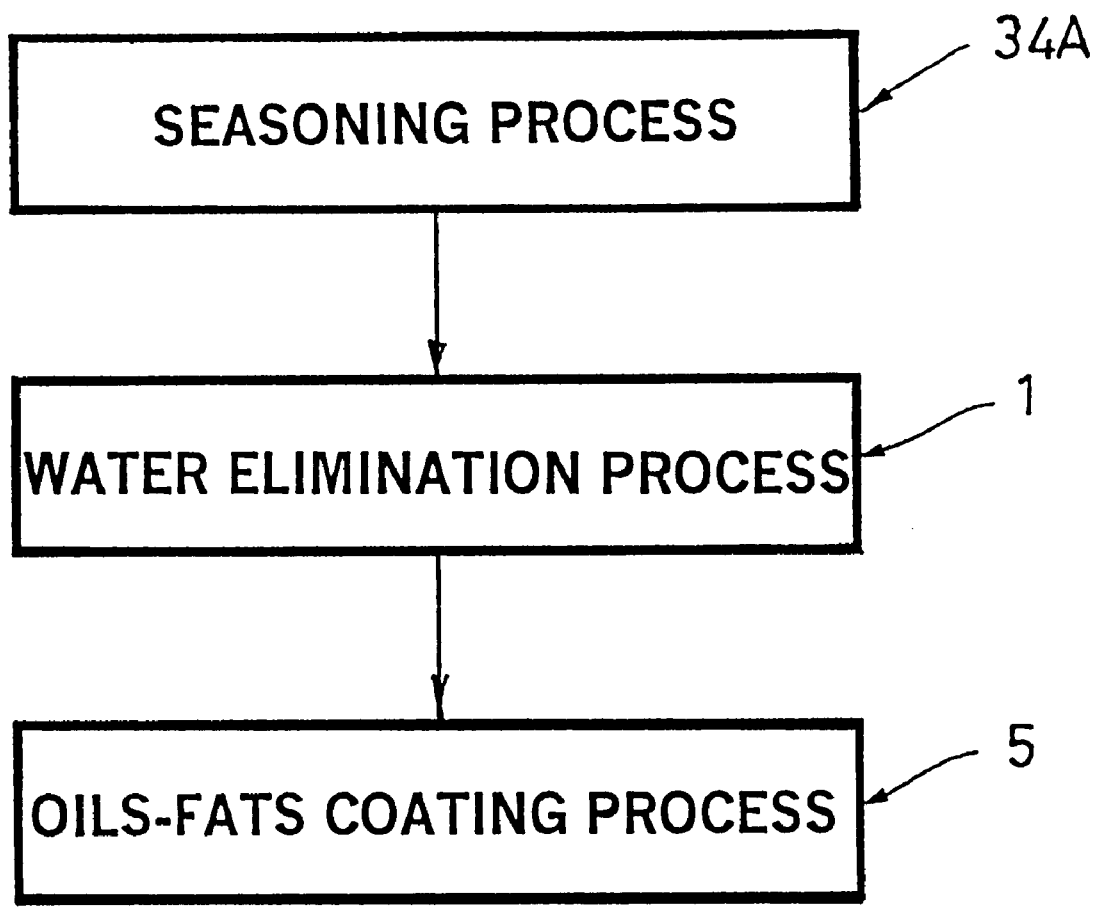
FIG. 12 is a flow chart showing a third embodiment of the present invention.
Figure 13:
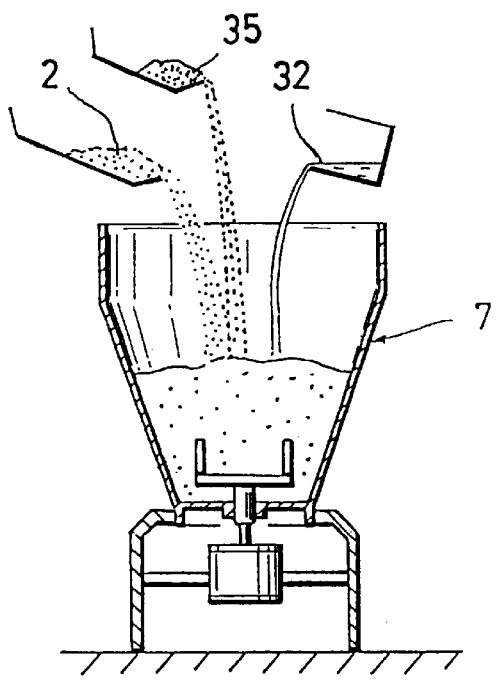
FIG. 13 is an explanatory view of a seasoning process showing a third embodiment of the present invention.
Figure 13:
Figure 13:
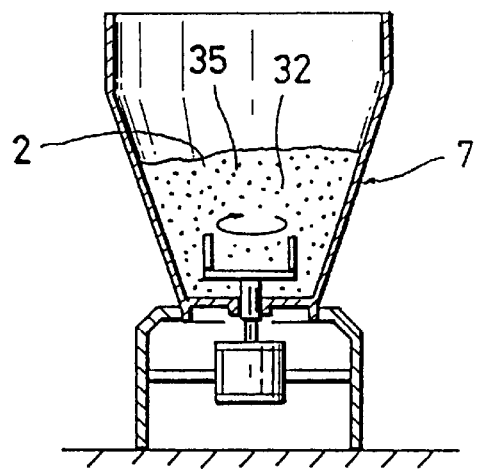
Figure 13:
Figure 13:
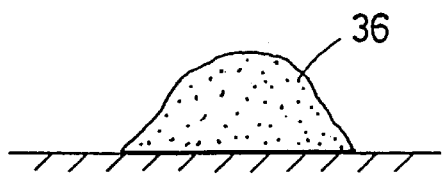
Figure 14:
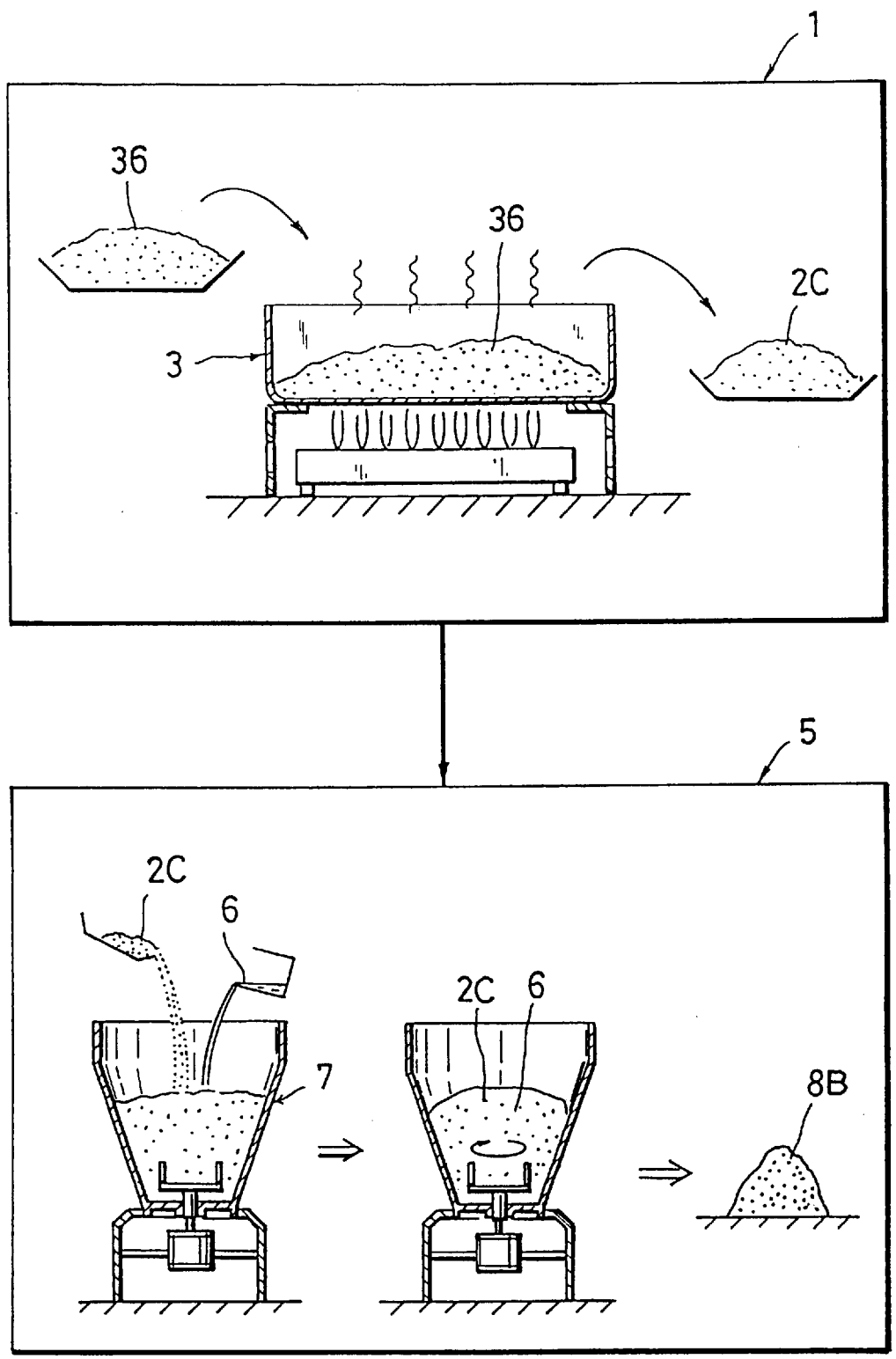
FIG. 14 is an explanatory view of a water elimination process and an oils-fats coating process.
Figure 15:
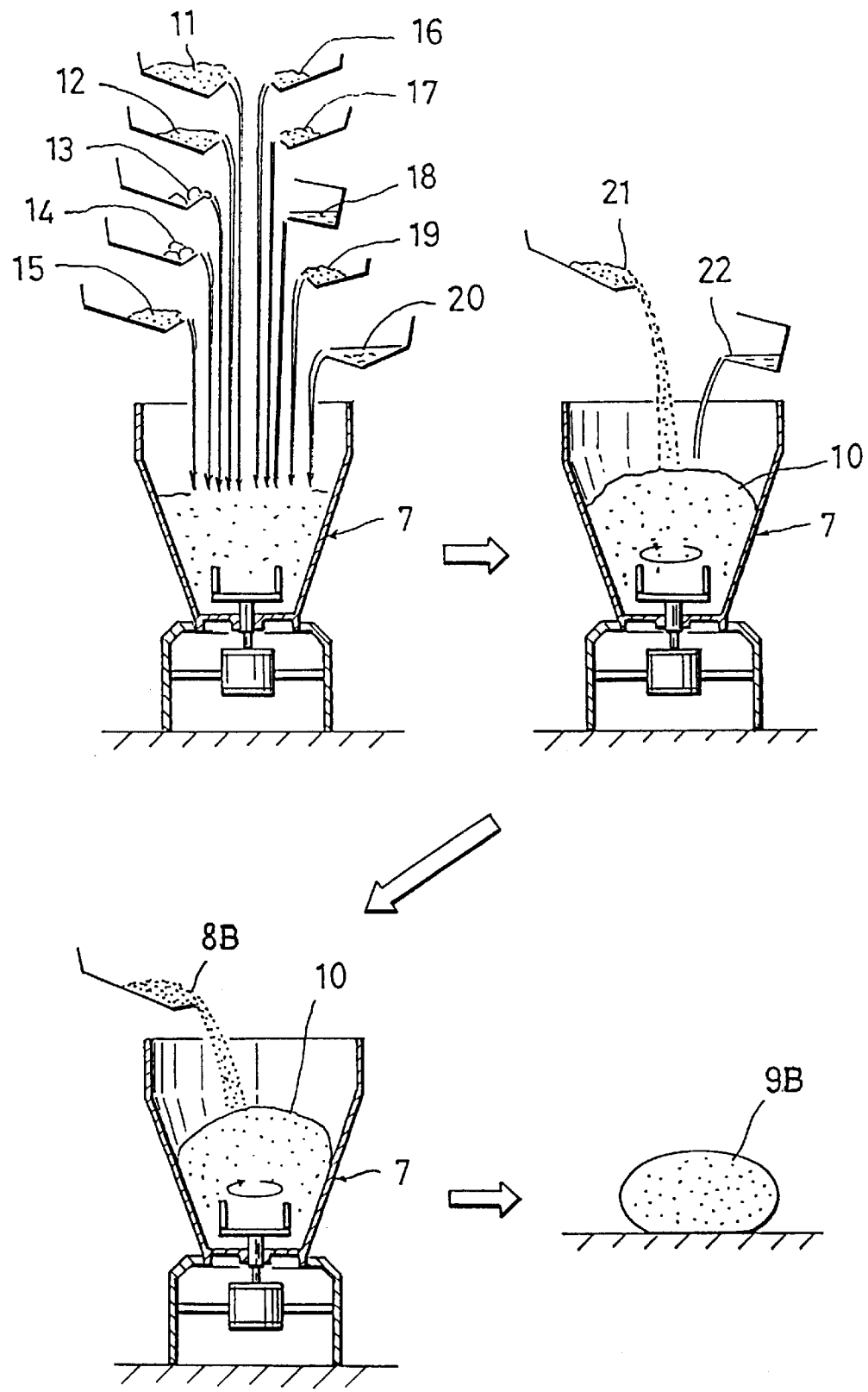
FIG. 15 is an explanatory view of making a dough of bread.

As illustrated in FIG. 7, in case of making dough 27 of a French bread containing 30% by weight of the additive 8, 3 kg of French bread powder 29 as materials of a dough body 28 of the French bread, 45 g of salt 26, 18 g of dried molt 30, 30 g of dried yeast 31, and 1.86 kg of water 22 are added into the mixer 7. Then, the mixer 7 stirs the mixture for six minutes at slow speed, and then for one minute at a medium speed. After that, 350 g of the oil-fat 6 and 900 g of the additive 8 of bread are added. After it is stirred for two minutes at low speed, the dough 27 of the French bread can be produced.

DIFFERENT PREFERRED EMBODIMENT OF THE INVENTION

Other embodiments of the present invention will now be described referring to FIGS. 8 to 15. Through the drawings of the embodiments, like components are denoted by like numerals as of the first embodiment and will not be further explained.

A second embodiment of the present invention is shown in FIGS. 8 to 11. It is distinguished from the first embodiment by the fact that a seasoning process 34 is conducted so that a seasoned rice bran 33 can be produced before the water elimination process 1. In the seasoning process 34, the rice bran 2 is added a liquid seasoning 32 such as raw sugar or honey for taste and mixed by the mixer 7. After that, the water elimination process 1 is conducted, a dried seasoned rice bran 2B is produced, and the oil-fat coating process 5 is processed. An additive 8A of bread produced by using such seasoning process 34 can be used as the seasoned additive 8A of bread. Even if the seasoned additive 8A is added to the dough body of bread, cakes, cookies, noodles, paste or food for dog, and the dough 9A of bread is produced by the above-mentioned method, the dough 9A can be used without losing taste.

Moreover, other than raw sugar and honey, a liquid seasoning 32 may be utilized for a single or plurality of materials such as cinnamon, cocoa, coffee, chocolate, soybean paste, soy source, powdered green teat, mugwort, fruit paste, wheat gluten, fruit wine, spice, sweetener, fruit juice, vegetable extract, jam, or cola.

A third embodiment of the present invention is shown in FIGS. 12 to 15. It is distinguished from the second embodiment by the fact that a seasoned rice bran 36 containing a charcoal is produced. In this process, to the rice bran 2, 0.1 to several percent by weight of a powdered charcoal 35, preferably made from bamboo, and the liquid seasoning 32 are added in a mixer 7 and mixed. After the water elimination process 1, a dried-seasoned rice bran containing charcoal 2C is produced. Next, an additive 8B is produced by executing the oil-fat coating process 5 such that the oil-fat 6 coats the surfaces of the particle of the rice bran 2 and the powdered charcoal 35 of the dried-seasoned rice bran 2C respectively. Even if the additive 8B containing a charcoal produced by the seasoning process 34A is added to the dough body of bread, cakes, cookies, noodles, pasta or food for dogs, and the dough 9B is produced as the above-mentioned method, the bread based on the dough 9B can be produced without losing taste.

By eating bread made of the additive 8B containing such charcoal of, the charcoal absorbs the accumulated dioxins, and it can be discharged without constipation.

In the embodiment of the present invention, to the rice bran 2, 0.1 to several percent by weight of the powdered charcoal 35 may be mixed with a liquid such as chocolate beforehand, and then, the surface of the particle of charcoal may be coated by such chocolate so as to remove the unique smell of the charcoal.

Moreover, in case of producing the dough, the seasoned rice bran 33 and the powdered charcoal 35 coated by chocolate may be used without the dried-seasoned rice bran 2C containing charcoal. In detail, after the dough body of bread is mixed by kneading, the mixture with the seasoned rice bran 33 is mixed by kneading for six minutes. After that, the powdered charcoal 35 may be added and stirred evenly.

In addition, concerning the oil-fat coating process, this process may allow the oil-fat 6 such as a fresh butter or margarine formed in a solid condition at a normal temperature or low temperature to transform into a liquid condition. Then, the liquid is added to one of the rice brans selected from dried rice bran 2A, dried-seasoned rice bran 2B or dried-seasoned rice bran 2C containing charcoal and mixed, and the liquid mixture is processed such that it is formed in the shape of a sheet at a normal temperature or low temperature. As a result, one of the dried rice bran 2A, dried-seasoned rice bran 2B or dried-seasoned rice bran 2C is selected. The selected rice bran is coated by oil-fat 6.

NOTE

1. A bread dough includes a dough body mixed with a seasoning such as wheat, water, sugar and an additive composed of a rice bran mixed with the dough body, the rice bran eliminating the water by roasting and drying, and an oil-fat coating such that the oil-fat covers a surface of a particle of the rice bran.

2. A bread dough includes a dough body mixed with a seasoning such as wheat, water or sugar, an additive composed of a seasoned rice bran mixed with the dough body, the seasoned rice bran being dried after a liquid seasoning of raw sugar or honey is mixed therewith, and an oil-fat coating such that the oil-fat covers a surface of a particle of the seasoned rice bran.

3. A bread dough includes a dough body mixed with a seasoning such as wheat, water or sugar; and an additive composed of a dried-seasoned rice bran containing a charcoal mixed with the dough body, the dried-seasoned rice bran adding a powdered charcoal and being dried after a liquid seasoning such as raw sugar or honey, mixed and dried therewith, and an oil-fat coating such that a surface of a particle of the seasoned rice bran containing the charcoal and a surface of a particle of the charcoal are coated by the oil-fat.

As set forth above, the advantages of the present invention are as follows:

(1) A method for producing an additive for bread or the like comprises a water elimination process that eliminates contained water by roasting or drying a rice bran and an oil-fat coating process that adds an oil-fat to a dried rice bran that eliminates water by the water elimination process and mixing, the oil-fat coating process covering a surface of the dried rice bran so that it can effectively prevent the smell and bitterness derived from the rice bran by coating the surface of each rice bran particle with the oil-fat and the absorbent of the water from the dough of bread even though the rice bran is used as an additive.

Therefore, the rice bran as the additive can be used without spoiling the taste.

(2) As discussed above, it is relatively easy to produce since the rice bran is just coated by the oil-fat after water has been eliminated.

Therefore, it is unnecessary to use an expensive facility, and it is easy to produce.

(3) As discussed above, it lasts long term and is economical to use since it eliminates the water and covers the oil-fat.

(4) As discussed above, the rice bran can be used as an additive so that the rice bran can be used effectively and can act on human body with goods effects due to eating it.

What is claimed is:

1. A method for producing an additive for bread, comprising the steps of:
   (a) eliminating water from rice bran to produce dried rice bran;
   (b) coating the dried rice bran with an oil-fat by adding the oil-fat to the dried rice bran and mixing the oil-fat and dried rice bran until a surface of the dried rice bran is coated with the oil-fat; and
   (c) adding at least 0.1 percent by weight of powdered charcoal, together with liquid seasoning including raw sugar or honey to the rice bran prior to said water eliminating step, said water eliminating step comprising roasting or drying the rice bran.

2. An additive for bread, comprising:
   (a) rice bran which has had water eliminated therefrom;
   (b) an oil-fat coated on a surface of said rice bran; and
   (c) at least 0.1 percent by weight of powdered charcoal, together with liquid seasoning including raw sugar or honey mixed with said rice bran prior to eliminating water therefrom.

* * * * *